United States Patent

Moores

[11] Patent Number: 5,828,682
[45] Date of Patent: Oct. 27, 1998

[54] RATIONAL-HARMONIC APPARATUS AND TECHNIQUE

[75] Inventor: John D. Moores, Concord, Mass.

[73] Assignee: Massachusetts Institute of Technology, Cambridge, Mass.

[21] Appl. No.: 779,807

[22] Filed: Jan. 8, 1997

[51] Int. Cl.[6] .................................................. H01S 3/10
[52] U.S. Cl. .................... 372/26; 372/6; 372/92
[58] Field of Search ................... 372/6, 26, 92

[56] References Cited

U.S. PATENT DOCUMENTS

| | | | |
|---|---|---|---|
| 5,436,925 | 7/1995 | Lin et al. | 372/6 |
| 5,513,194 | 4/1996 | Tamura et al. | 372/6 |

OTHER PUBLICATIONS

Onodera, N., et als., "Frequency multiplication in actively mode–locked semiconductor lasers", vol. 62 *Appl. Phys. Lett.*, No. 12 (Mar. 22, 1993).

Yoshida, E., et al., "80–200ghz erbium doped fibre laser using a rational harmonic mode–locking technique", vol. 32 *Electronic Letters*, No. 15 (Jul. 18, 1996).

*Primary Examiner*—Leon Scott, Jr.
*Attorney, Agent, or Firm*—Testa, Hurwitz & Thibeault, LLP

[57] ABSTRACT

A modulated cavity including a cavity; a modulation source; and a modulator located with said cavity and in electrical communication with said modulation source. The modulation source overdrives the modulator with a period of modulation $T_{mod}$ substantially equal to $T_{roundtrip}(n+(p/q))^{-1}$. n, p, and q are integers. $T_{roundtrip}$ is the period of a pulse making one round-trip in the cavity. In one embodiment of the invention p and q are relatively prime. In another embodiment of the invention the optical response of the modulator includes the qth harmonic of $(1/T_{mod})$. In yet another embodiment of the invention p/q is an integer. In still yet another embodiment of the invention p/q is a rational number.

12 Claims, 3 Drawing Sheets

RATIONAL-HARMONIC APPARATUS AND TECHNIQUE

This application claims the benefit of U.S. Provisional Application No. 60/032,729, filed Dec. 13, 1996.

FIELD OF THE INVENTION

The invention relates generally to the field of signal modulation and in particular, to modulation of signals in resonant cavities.

BACKGROUND OF THE INVENTION

Optical memories and modulated lasers are important components for optical communication systems such as ultra-high speed optical communications networks. Such ultra-high speed optical systems have previously required the use of ultra-high speed driving of the modulators to modulate the signal beam. However, the ultra-high speed modulation rates required by such systems require modulators and signal sources operating at ultra-high rates. These components are either expensive or unavailable.

The present invention provides a method for providing ultra-high speed modulation of a signal while driving a modulator at a lower rate.

SUMMARY OF THE INVENTION

In one aspect, the invention relates to a modulated cavity including a cavity; a modulation source; and a modulator located with the cavity. The modulator is in electrical communication with said modulation source. The modulation source overdrives the modulator with a period of modulation $T_{mod}$ substantially equal to $T_{roundtrip}(n+(p/q))^{-1}$. n, p, and q are integers and $T_{roundtrip}$ is the period of a pulse signal making one round-trip in the cavity. The modulator is overdriven so as to generate harmonics of the modulation frequency in its response to the modulation source. In one embodiment of the invention p and q are relatively prime. In another embodiment of the invention the optical response of the modulator includes the qth harmonic of $(1/T_{mod})$. In still yet another embodiment of the invention p/q is a rational number. In another embodiment of the invention the cavity is a laser cavity. In another embodiment of the invention the cavity is a optical ring buffer.

In another aspect, the invention relates to a method for modulating a signal within a resonant cavity including the steps of providing a resonant cavity having a modulator located within the cavity and overdriving the modulator. The modulator is driven with a period of modulation $T_{mod}$ substantially equal to $T_{roundtrip}(n+(p/q))^{-1}$. n, p, and q are integers and $T_{roundtrip}$ is the period of a pulse signal making one round-trip within the cavity. In one embodiment p and q are relatively prime. In another embodiment the optical response of the modulator includes the qth harmonic of $(1/T_{mod})$. In still yet another embodiment p/q is a rational number. In another embodiment the cavity is a laser cavity. In yet another embodiment the cavity is a ring buffer.

BRIEF DESCRIPTION OF THE DRAWINGS

The foregoing and other objects, features and advantages of the invention will become apparent from the following more particular description of preferred embodiments of the invention, as illustrated in the accompanying drawings.

DETAILED DESCRIPTION OF THE INVENTION

Figure 1:
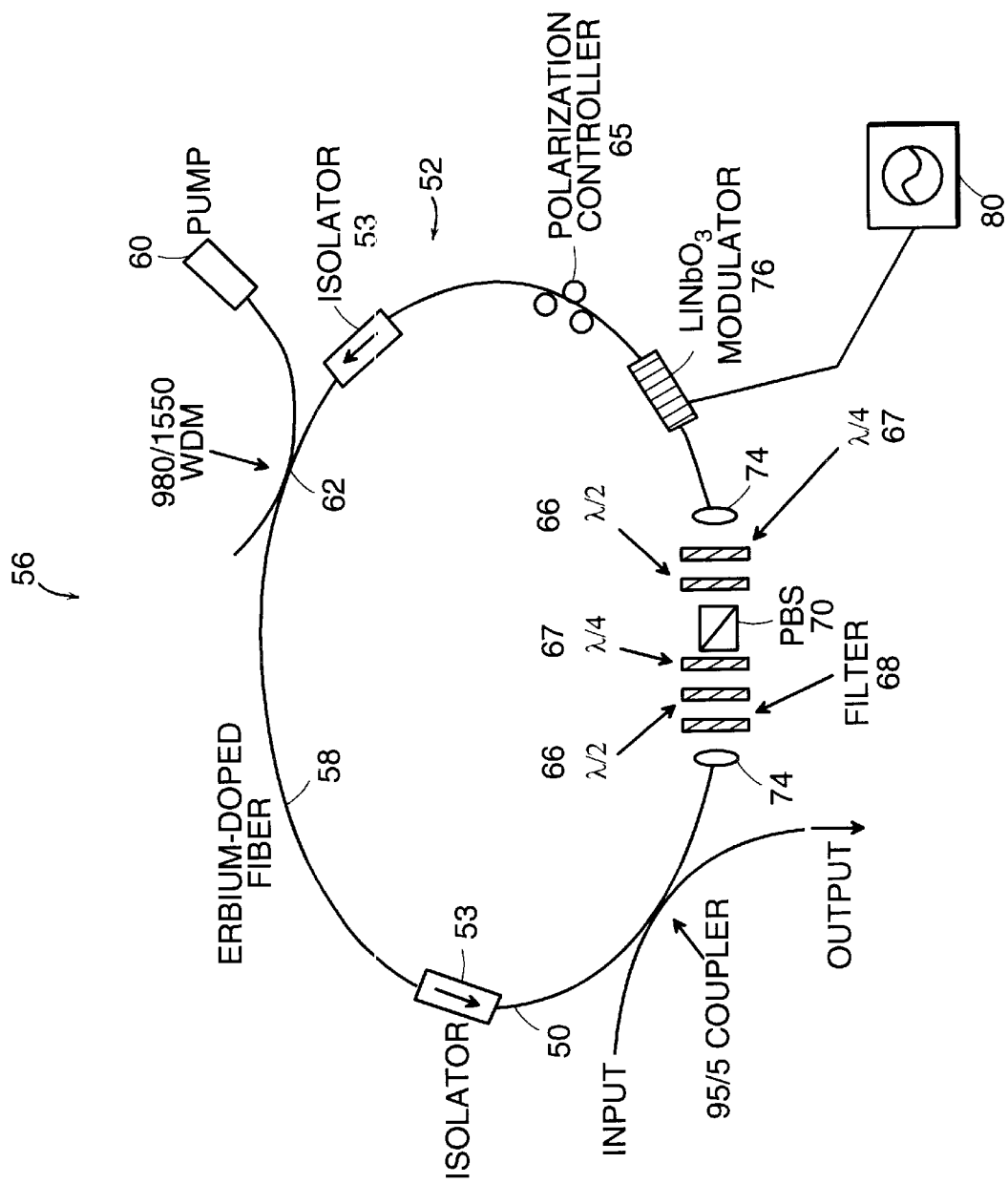
FIG. 1 is an one embodiment of an optical cavity which incorporates an embodiment of the rational harmonic modulator of the invention.

FIG. 1 is an embodiment of an optical cavity in the form of an optical memory or ring buffer including an embodiment of the rational harmonic modulator of the invention. Such an optical cavity or ring buffer includes an optical fiber 50 configured to form a loop 52 of a fixed length which defines a fundamental cavity frequency. The fiber 50 may be single mode fiber such as SMF-28 fiber. In one embodiment, two fiber-pigtailed polarization sensitive isolators 53 disposed in the loop 52 restrict propagation of optical signals in the fiber 50 to one direction. A coupler 54, shown here as a 95/5 fiber coupler, communicating with the loop 52 is utilized to couple a portion of the optical signals propagating in the loop 52 out of the loop 52. The coupler 54 may also be utilized to couple optical signals into the loop 52.

In the embodiment shown a 3.3 m fiber amplifier 56 disposed in a portion of the loop 52 is used to amplify optical signals propagating in the loop 52. The fiber amplifier 56 may include a highly-doped rare-earth fiber 58 and a pump laser 60 coupled to the doped rare-earth fiber 58 by a wavelength division multiplexing coupler 62. Examples of rare-earth doped fibers are erbium, praseodymium, ytterbium-erbium or thulium doped fiber. For example, an erbium-doped fiber amplifier may be pumped by a master oscillator power amplifier (MOPA) at 980 nm with typical output power of 1 W, with 500 mW coupled into the amplifier.

The optical cavity also includes one or more polarization controllers 65 which control the polarization states of the optical signals in the loop 52. In the embodiment shown, two half-wave waveplates 66, two quarter-wave waveplates 67, a 6 nm bandwidth filter 68, and a polarization beam splitting cube 70, are disposed in the loop 52 within a 30 cm gap between the ends of the loop fiber 50. Lens 74 terminates each of the ends of the fiber 50 to thereby form the loop 52. These components also may be used to control the polarization states of the optical signals in the loop 52. The round trip frequency of the loop is typically between 5–30 MHz and in one embodiment is 13.165 MHz.

Figure 2:
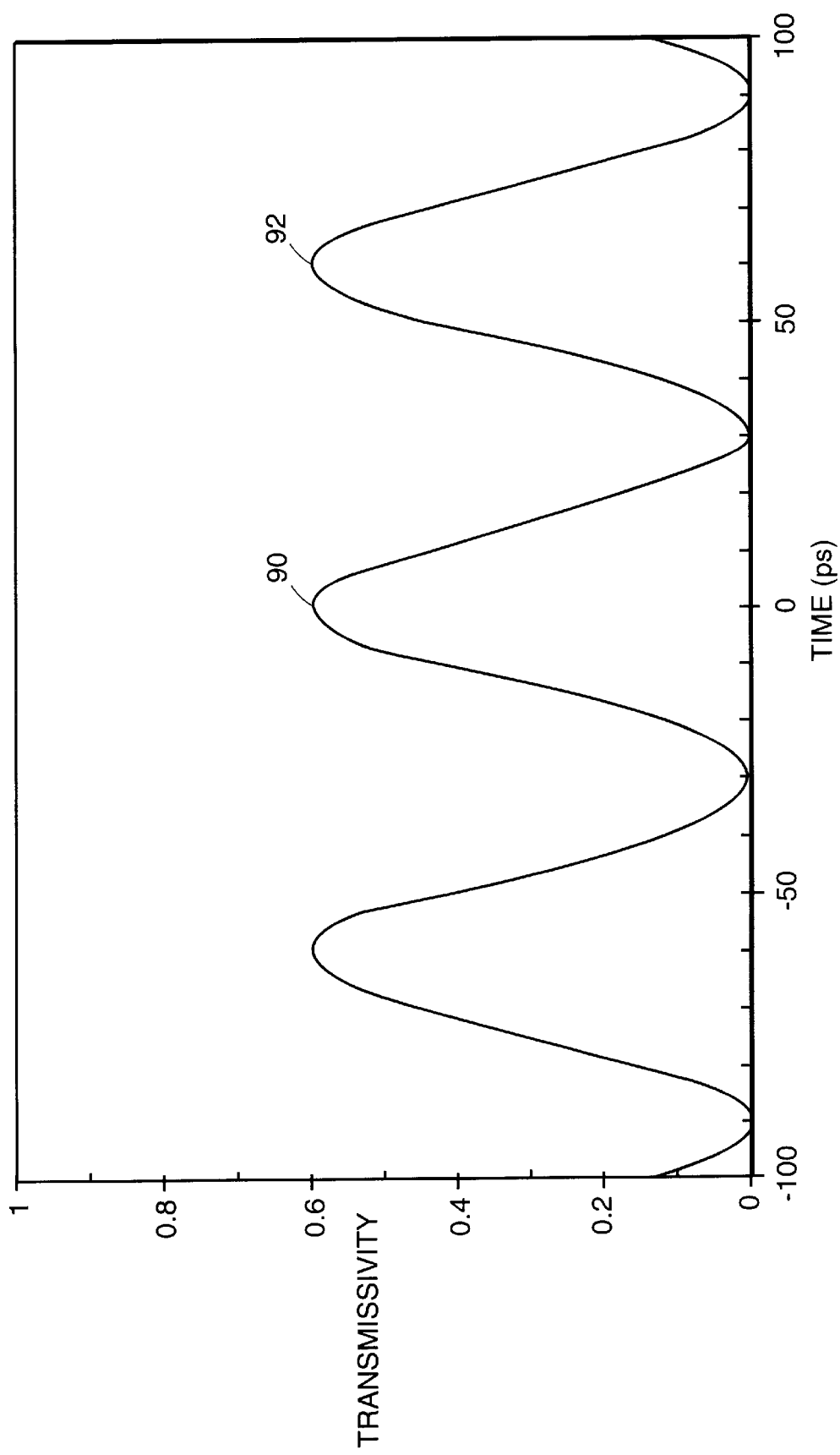
FIG. 2 is a graph of the intensity transmission of a modulator as a function of time when the modulator is driven by a sinusoidal driving waveform.

A modulator 76 is utilized to modulate the optical pulse stream traveling within the loop 52. The modulator may be a LiNbO$_3$ amplitude modulator driven by a sinusoidal rf-source 80. Referring also to FIG. 2, when not overdriven, the transmissivity of the modulator 76 varies periodically with time with the frequency of the driving rf-sinusoid. As the graph is drawn, the time for a round trip of the loop has been subtracted such that a data bit circulating the loop at the fundamental loop frequency will appear again at the modulator at the intensity maximum 90 designated as 0 time. As a result, with the correct choice of rf frequency from the modulation source 80 (FIG. 1), a data bit circulating in the loop 52 and passing through the modulator 76 at a peak 90 in the transmissivity curve, will continue to circulate in the loop 52 and return to the modulator 76 at the time of the same maximum 90 or another maximum 92 in transmission. In such a system, the circulating data rate is equal to the rate at which the modulator is driven. This is the manner by which cavity modulation has been accomplished previously.

Figure 3:
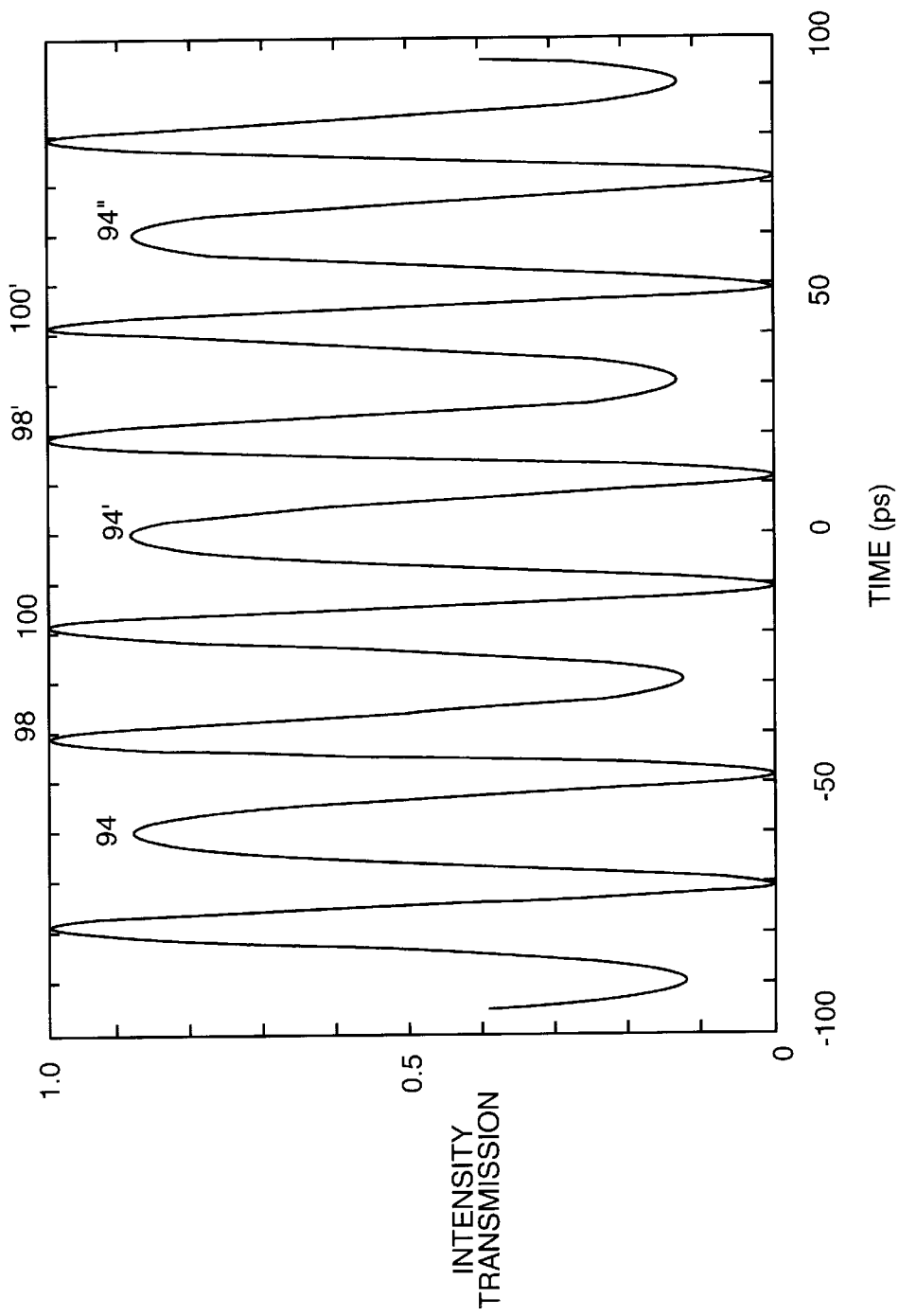
FIG. 3 is a graph of the intensity transmission of a modulator as a function of time when the modulator is overdriven by a sinusoidal driving waveform so as to generate a strong third harmonic.

Referring to FIG. 3, when a modulator 76 is overdriven, not only is the transmission periodic with the frequency of the driving sinusoid, but it also exhibits harmonics of this frequency. FIG. 3 depicts an example of an overdriven response with a strong third harmonic component. Thus in addition to local maximum 94, there are local maxima 98 and 100 within one period. As a result, it is possible to choose an rf driving frequency such that (assuming that a data pulse initially arrives at the modulator 76 substantially at the peak of maximum transmission 94) upon one additional circuit of the loop 52, the data pulse will arrive back at the modulator 76 when the transmission is substantially at another transmission peak, e.g. 98 caused by a harmonics of the driving frequency. Thus in the example shown, the rf driving frequency may be selected such that at the end of the first circuit the data pulse arrives at the modulator at transmission maximum 98 and at the end of the second circuit the pulse will arrive at modulator 76 substantially at transmission maximum 100.

At the end of the third circuit, the pulse will again arrive at a transmission local maximum 94' caused by the rf driving frequency. Thus in this case, the rf driving frequency using such harmonic components may be one third of the driving frequency required by a modulator using only the fundamental driving frequency. So for the same data modulation frequency the modulator itself need only be driven at one third the data modulation frequency. Since it is possible to generate ten or more transmission maxima peaks between the peaks caused by the rf driving frequencies using such harmonics, it is possible to reduce the rf driving frequency by an order of magnitude without affecting the modulation frequency.

The relationship between the modulation frequencies and the time it takes for a pulse to make one round trip through the cavity is given by the expression:

$$T_{mod} = T_{roundtrip} (n+(p/q))^{-1}$$

Where $T_{mod}$ is the period of the input signal to the modulator, $T_{roundtrip}$ is the period of a pulse making a round-trip through the cavity and where n, p and q are integers. If p and q are relatively prime, that is, having a greatest common divisor of 1, and if the overdriven modulator response exhibits qth harmonics, then each of the types of transmission maxima associated with the qth harmonic will have been coincident with the data pulse after q circuits of a loop having a modulator which is overdriven into harmonic response.

If p and q are not relatively prime then not all harmonic peaks will coincide with the data pulse in its circuit of the loop. Thus it is possible to create a certain number of harmonics and not utilize all the transmission maxima. If p and q are relatively prime, a rational harmonic modulator typically will be most efficient when the response of the modulator exhibits a strong component of the qth harmonic of the driving frequency.

Thus, for this modulation technique, the modulation rate is time shifted, relative to the circulating data, by a fraction of the modulation rate for each round trip of the data. Therefore, after a number (the ratio of the data rate to the modulation rate) of round trips, the data is modulated at an effectively high-rate. This rate is equal to the product of q and the modulation rate. The effective data modulation function may be approximately equal to the product of each of the time-shifted single-pass modulator responses.

For example, the transmission of a Mach-Zehnder modulator having its two arms being driven $\pi$ radians out of phase and with an optical phase bias $\phi_b$ between the arms is proportional to $\cos^2[A\cos(\Omega t)+\phi_b/2]$, where A is the peak-to-peak phase shift excursion and $\Omega$ is the driving frequency in radians/second. With no modulator input (A=0), transmission is minimized for $\phi_b=\pi$ and maximized for $\phi_b=0$. The product of such N delayed responses of the modulation function in which each response is delayed by a fraction M / N of a period from the previous response, is given by the expression:

$$\prod_{n=0}^{N-1} \cos^2[A\cos(\Omega t - 2\pi Mn/N) + \phi_b/2] =$$

$$\prod_{n=0}^{N-1} \left[ \frac{1+J_0(2A)\cos\phi_b}{2} + \right.$$

$$\sum_{l=1}^{\infty} \left( (-1)^l \left\{ \cos\phi_b J_{2l}(2A)\cos\left[2l\left(\Omega - \frac{2\pi n}{N}\right)\right] + \right.\right.$$

$$\left.\left.\sin\phi_b J_{2l-1}(2A)\cos\left[(2l-1)\left(\Omega t - \frac{2\pi n}{N}\right)\right]\right\}\right)$$

where M and N are integers, having a greatest common divisor (gcd) equal to 1 (gcd(M, N)=1), and $J_m(x)$ is the mth-order Bessel function evaluated at x.

Physically, this corresponds to even or odd harmonics when the phase is biased at an even or odd symmetry point of the squared cosine respectively. Adjusting the phase bias $\phi_b$ adjusts the relative amounts of even versus odd harmonics. Frequency doubling occurs at $\phi_b=$/I$\pi$, where I an integer.

In a system in which the bias drifts, phase biasing the modulator at I$\pi$ with a driving frequency which is an harmonic of the cavity fundamental frequency may not be an optimum way to achieve higher rates. This is because as the bias drifts, the neighboring bit intervals will experience different modulation where ideally the transmission maxima do not differ appreciably in amplitude. As a result, successive pulses might have different intensities.

In contrast, the product of delayed terms typically has a fundamental frequency N times the fundamental frequency of an individual factor [if the individual factor is at K$\Omega$ and gcd(N, K)=1], as can be shown with the identity $$\sum_{n=0}^{N-1} \cos\left[m\left(B - \frac{2\pi Mn}{N}\right)\right] = \begin{cases} N\cos mB & m|N \\ 0 & \text{else} \end{cases},$$

m an integer. Because the average modulation is the same for each bit interval, there is less sensitivity to bias drift.

Thus with this modulation scheme, the number of harmonics is increased as the driving power increases. Therefore the order of the harmonics is limited only by the driving power available. When the proper order criteria are met, a data pulse train can be modulated at some multiple of the driving frequency of the modulator.

Although the invention has been discussed in terms of an optical ring buffer, any resonant cavity may be used as well as any pulse frequency. As such the invention may be used not only to modulate optical signals in a laser cavity but to modulate, for example, microwave signals in a maser cavity.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A modulated cavity comprising:

a cavity;

a modulation source;

a modulator located with said cavity and in electrical communication with said modulation source wherein said modulation source overdrives said modulator with a period of modulation $T_{mod}$ substantially equal to:

$$T_{roundtrip} \, (n+(p/q))^{-1}$$

wherein n, p, and q are integers and $T_{roundtrip}$ is the period of a signal making one round-trip of the cavity.

2. The modulated cavity of claim 1 wherein p and q are relatively prime.

3. The modulated cavity of claim 1 wherein the optical response of the modulator includes the qth harmonic of $(1/T_{mod})$.

4. The modulated cavity of claim 1 wherein p/q is a rational number.

5. The modulated cavity of claim 1 wherein the cavity is a laser.

6. The modulated cavity of claim 1 wherein the cavity is a optical ring buffer.

7. A method for modulating a cavity comprising:

providing a cavity having a modulator located with said cavity;

overdriving said modulator with a period of modulation $T_{mod}$ substantially equal to:

$$T_{roundtrip} \, (n+(p/q))^{-1}$$

wherein n, p, and q are integers and $T_{roundtrip}$ is the period of a signal making one round-trip of the cavity.

8. The method of claim 7 wherein p and q are relatively prime.

9. The method of claim 7 wherein the optical response of the modulator includes the qth harmonic of $(1/T_{mod})$.

10. The method of claim 7 wherein p/q is rational.

11. The method of claim 7 wherein said cavity is a laser.

12. The method of claim 7 wherein said cavity is a ring buffer.

* * * * *

UNITED STATES PATENT AND TRADEMARK OFFICE
CERTIFICATE OF CORRECTION

PATENT NO. : 5,828,682
DATED : October 27, 1998
INVENTOR(S) : John D. Moores

It is certified that error appears in the above-identified patent and that said Letters Patent is hereby corrected as shown below:

In column 1, after the title, please insert the following:

---<u>Government Support</u>

This invention was made with government support under Contract Number F19628-90-C-0002 awarded by the Department of the Air Force. The government has certain rights in the invention.---

Signed and Sealed this

Fourteenth Day of September, 1999

*Attest:*

Q. TODD DICKINSON

*Attesting Officer*     *Acting Commissioner of Patents and Trademarks*